(No Model.)
O. M. MITCHELL.
SPRING FOR BICYCLE SADDLES.
No. 294,655. Patented Mar. 4, 1884.
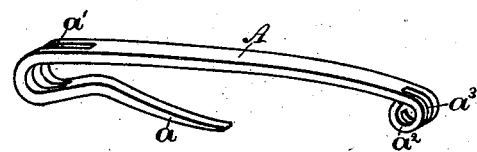
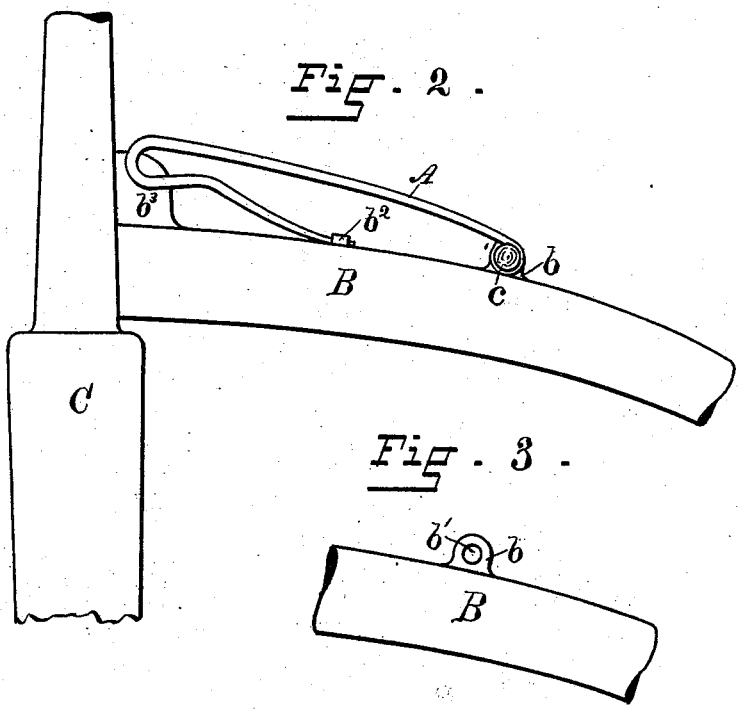
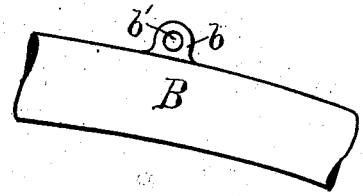
WITNESSES:
C. H. Leuther Jr
Fred. E. Field
INVENTOR:
Oliver M. Mitchell
by Joseph A. Miller & Co.
Attys

UNITED STATES PATENT OFFICE.

OLIVER M. MITCHELL, OF PROVIDENCE, RHODE ISLAND.

SPRING FOR BICYCLE-SADDLES.

SPECIFICATION forming part of Letters Patent No. 294,655, dated March 4, 1884.

Application filed January 17, 1884. (No model.)

*To all whom it may concern:*

Be it known that I, OLIVER M. MITCHELL, of Providence, in the county of Providence and State of Rhode Island, have invented a new and useful Improvement in Springs for Bicycle-Saddles, of which the following is a specification.

The object of my invention is to produce a saddle-spring of simple form and efficient action.

The invention consists in the peculiar and novel construction of the spring and in its combination with a bicycle provided with certain attachments for holding the spring in operative position.

In the accompanying drawings, Figure 1 is a perspective view of the spring. Fig. 2 is a side elevation of part of a bicycle with my improved spring applied. Fig. 3 is a side view of a fragment of the backbone of a bicycle, showing one of the spring-attaching devices.

In the said drawings, A designates my improved spring, which is made of resilient metal. At one end the body A is bent downward and then backward under the body, and terminates in a flattened extremity, $a$. At this bend the spring is formed with a slot, $a'$, as is shown in Fig. 1. The opposite end of the body A is bent downward and upward, so as to form an eye, $a^2$. This bend or loop $a^2$ is also provided with a slot, $a^3$, similar to the slot $a'$, as shown in Fig. 1.

B designates the backbone of a bicycle, and C the fork of the same. Upon the upper side of the backbone is formed or secured a rib, $b$, which is placed at the point occupied by the eye end of the spring. The rib $b$ is formed with an eye, $b'$, as shown in Fig. 3.

$b^2$ designates a strap or bridge, which is formed or secured upon the backbone at such a point as to receive the end $a$ of the spring A. Upon the upper side of the backbone, at its forward end, is formed or secured a rib, $b^3$, which occupies such a position and is of such shape as to engage the front end of the spring A.

In applying this spring the end $a$ is passed under the strap $b^2$, and the rib $b^3$ is caused to enter the slot $a'$ of the spring. The rib $b$ is caused to enter the slot $a^3$, and a bolt or pin, $c$, is passed through the eyes $a^2$ and $b'$.

The seat is suitably secured to the body A.

Having thus described my invention, I claim as new and desire to secure by Letters Patent—

1. The spring A, having the front bend and flattened end $a$ and the eye $a^2$, as set forth.
2. The spring A, having the front bend and the flattened end $a$ and the eye $a^2$, and provided with the slots $a'$ $a^3$, as set forth.
3. The ribs $b$ $b^3$ and the strap $b^2$, formed upon the backbone of a bicycle, the rib $b$ being formed with an eye, $b'$, in combination with the spring A, having the front bend and flattened end $a$, the eye $a^2$, and slots $a'$ $a^3$, and the pin or bolt $c$, all arranged and operating as set forth.

OLIVER M. MITCHELL.

Witnesses:
J. A. MILLER, Jr.,
M. F. BLIGH.